United States Patent [19]
Tiramani

[11] 3,856,277
[45] Dec. 24, 1974

[54] SCREEN ASSEMBLY FOR PROCESSING PLASTIC

[75] Inventor: Marco Tiramani, Gloucester, Mass.

[73] Assignee: Gloucester Engineering Co. Inc., Gloucester, Mass.

[22] Filed: Sept. 28, 1973

[21] Appl. No.: 401,901

[52] U.S. Cl. ............... 259/185, 209/481, 259/193, 425/197
[51] Int. Cl. ............................................ B29b 1/12
[58] Field of Search ........... 259/185, 191, 192, 193, 259/4, 18, 36, 2; 209/422, 481; 425/202, 197

[56] References Cited
UNITED STATES PATENTS

| | | | |
|---|---|---|---|
| 2,242,364 | 5/1941 | Montanari | 259/193 |
| 2,595,210 | 4/1952 | Clinefelter | 259/193 |
| 2,948,920 | 8/1960 | Hausman | 259/185 |
| 3,284,848 | 11/1966 | Rice | 259/193 |

*Primary Examiner*—Robert W. Jenkins

[57] ABSTRACT

Screen assembly for plastic processing, in which a carrier has a pair of replaceable screen assemblies which can alternately be placed on stream, each assembly including screening sandwiched between breaker and backup plates which provide sliding seals against the machine body as the carrier is shifted, preventing plastic leakage.

5 Claims, 2 Drawing Figures

PATENTED DEC 24 1974

3,856,277

SCREEN ASSEMBLY FOR PROCESSING PLASTIC

BACKGROUND OF THE INVENTION

This invention relates to screen assemblies used to remove dirt particles from plastic being processed, e.g., for the manufacture of extruded foams.

To facilitate their changing, screens have been mounted in pairs in carriers slidable transversely to the direction of plastic flow to take one screen offstream and put the other screen on stream, in the path of molten plastic through the extruder machine or other conduit. It is important to prevent leakage of plastic past the carrier and out of the machine during the screen changeover; plastic containing blowing agents, e.g., will explode through such a leak, throwing hot plastic over a wide area, and reducing the density of the plastic remaining in the machine near the leak, producing a substandard product.

SUMMARY OF THE INVENTION

The invention provides an improved, foolproof, easily manufactured and operated screen changer assembly, making possible easy screen changeover without leakage, even during machine operation. The screens are easily removed from the carrier, without requiring excessive torque, even when hot and caked with plastic. Installation of a new screen in the carrier is foolproof, the mating of the various parts making improper installation impossible. Positive positioning of the screens is achieved.

In general the invention features a carrier with parallel upstream and downstream surfaces surrounding and extending between two screen apertures, and a breaker plate, screen, and back-up plate for each screen aperture, each breaker plate and the carrier having mating shoulders to locate the breaker plates at the downstream sides of the respective apertures and to prevent those plates from being forced downstream and out of the carrier by the pressure of the plastic, each backup plate having circumferentially spaced lugs arranged to fit downstream of correspondingly circumferentially spaced retainer extensions of the carrier to positively locate the backup plates along the axis of plastic flow, the axial dimension of the retainer extensions being equal to the corresponding axial spacing of the upstream lug surfaces from the upstream surfaces of their respective plates, so that when installed the upstream plate surfaces will be positively located as extensions of the upstream carrier surface. In preferred embodiments there are four equally spaced lugs on each backup plate, each extending slightly less than 45° circumferentially; at least one lug has an axially extending stop arranged to abut a retainer extension upon twisting of said backup plate about said axis during installation; the overall axial dimensions of the breaker and backup plates in sum equal that of the carrier so that the installed plates will axially locate and hold each other in the carrier; and the upstream surface of the breaker plate is recessed to receive the screening, the breaker plate having a rim surrounding the screening and contacting the downstream surface of the installed backup plate.

Other advantages and features of the invention will be apparent from the description of a preferred embodiment thereof, and from the drawings.

DESCRIPTION OF THE PREFERRED EMBODIMENT

Figure 2:
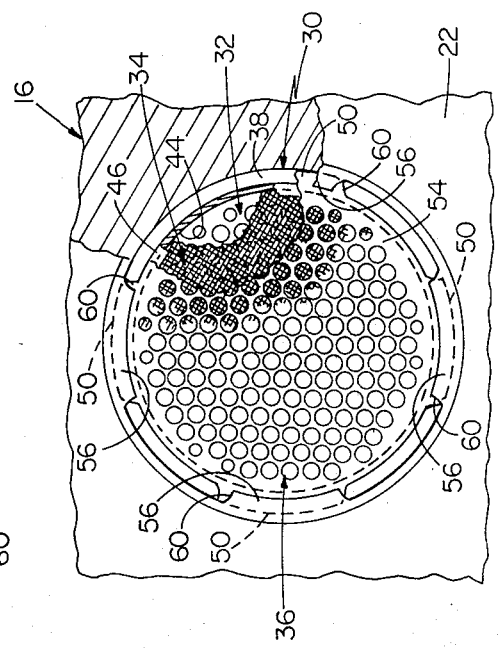
FIG. 2 shows a screen assembly in end view partially broken away.
Figure 1:
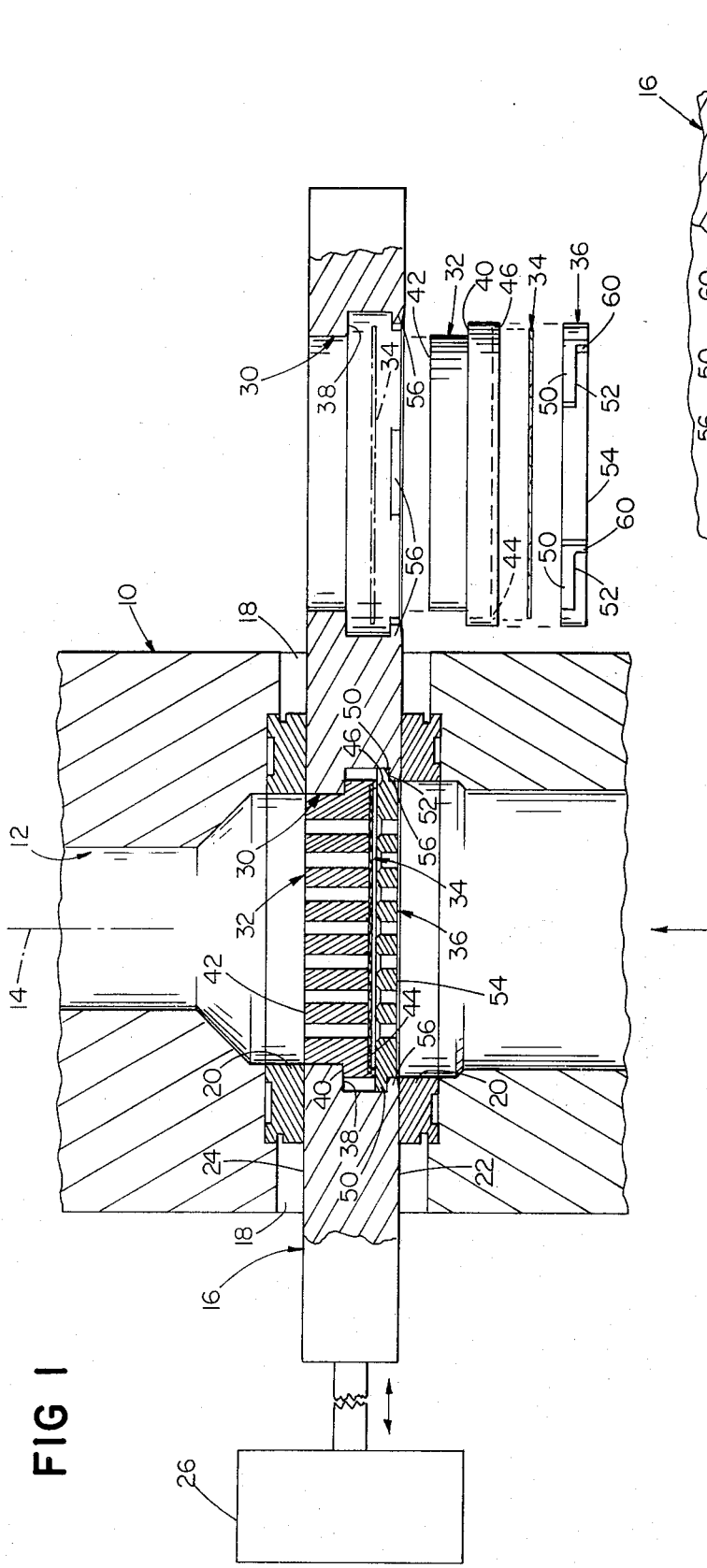
FIG. 1 is a sectional view showing a portion of the plastic processing apparatus including the screen changer embodying the invention, one of the screen assemblies being shown in exploded form.

Referring to the drawings, machine body 10 defines a duct 12 for flow of plastic along axis 14. Screen changer carrier 16 extends transversely across duct 12 and through openings 18 in the machine body. Annular seals 20, each surrounding the duct, seal slidingly against the upstream and downstream parallel surfaces 22 and 24 of carrier 16. Hydraulic cylinder 26 secured to one end of carrier 16 is operable to slide the carrier at right angles to axis 14.

Carrier 16 has a pair of apertures 30 each arranged to receive a screen assembly consisting of a perforated breaker plate 32, a screen pack 34, and a perforated backup plate 36. In particular, the carrier at each aperture 30 has at its downstream side an annular shoulder 38 arranged to mate with a corresponding annular shoulder 40 of breaker plate 32 to locate the breaker plate with its downstream surface 42 in the plane of, and forming a continuation of, carrier surface 24. Shoulders 38 and 40 prevent the breaker plate from being forced downstream and out of the carrier by the pressure of the flowing plastic during operation. Each breaker plate has a recess 44 at its upstream side to receive screen pack 34, so that the screen pack does not extend upstream of breaker plate rim 46 surrounding it. Each backup plate 36 has four equally spaced lugs 50. Each lug has a circumferential extent of slightly less than 45° and has its upstream surface 52 spaced from the upstream surface 54 of the backup plate proper. The carrier has four correspondingly equally spaced retainer extension portions 56 extending into each aperture 30. Each retainer extension 56 has a dimension along axis 14 equal to the spacing between surfaces 52 and 54, so that when backup plate 36 is inserted into the aperture (the insertion being carried out with lugs 50 between extensions 56) and twisted about axis 14 to bring lugs 50 behind extensions 56, surface 54 of the backup plate will lie in the plane of, and form a continuation of, surface 22 of the carrier. Lugs 50 further include upstanding stops 60 which act against extensions 56 to limit the twisting of the backup plate upon installation.

The overall axial dimensions of plates 32 and 36 are such that in sum they equal that of carrier 16. As a result, when installed, the backup plate holds the breaker plate shoulders 40 against carrier shoulders 38, and the breaker plate in turn, through its rim 46 in contact with plate 36, holds the backup plate lugs 50 against carrier extensions 56. The screen assembly is thus held snugly in recess 30 while still being easily removable for cleaning.

In operation, to take one screen assembly offstream and replace it with the other, cylinder 26 is actuated to slide carrier 16 until the previously offstream aperture 30 is aligned with duct 12. During the sliding movement the surfaces 42 and 54 of the breaker and backup plates move in sliding sealing contact with seals 20, preventing leakage of plastic from duct 12. As a result, the screens may be changed even while the machine is in operation. The manner of retention of the screen assemblies makes them easily removable, with minimum torque, even when hot and heavily coated with plastic material.

Other embodiments are within the following claims:

I claim:

1. In apparatus for processing plastic and having a body defining a duct for plastic flow along an axis, a screen changer comprising a carrier mounted in said apparatus for sliding movement across said duct and transverse to said axis, said carrier having two screen apertures and parallel upstream and downstream surfaces surrounding and extending between said apertures; and a screen assembly in each said aperture, each screen assembly comprising a breaker plate, a backup plate, and screening sandwiched between said plates;

each said breaker plate and said carrier having mating shoulders to locate said breaker plates with their downstream surface in the plane of, and forming extensions of, said downstream surface of said carrier, and to prevent said breaker plates from being forced downstream and out of said carrier by the pressure of plastic flow;

each said backup plate having circumferentially spaced lugs, and said carrier at each said aperture having circumferentially spaced retainer extensions extending into said aperture, said lugs and extensions being arranged to positively locate said backup plates along said axis, said lugs having upstream surfaces spaced axially from the upstream surfaces of their respective plates proper by a distance equal to the axial dimension of said retainer extensions, so that when installed in said apertures said upstream surfaces of said backup plates will be positively located along said axis in the plane of, and forming extensions of, said upstream carrier surface.

2. The screen changer of claim 1 comprising 4 equally spaced said lugs on each said backup plate, each said lug extending slightly less than 45° circumferentially.

3. The screen changer of claim 1 wherein at least one said lug of each said backup plate has an axially extending stop arranged to abut said retainer extension upon twisting of said backup plate about said axis during installation.

4. The screen changer of claim 1 wherein the overall axial dimensions of said breaker and backup plates in sum equal that of said carrier, so that upon installation said plates will axially locate and hold each other in said carrier.

5. The screen changer of claim 4 wherein the upstream surface of said breaker plate is recessed to receive said screening, and said breaker plate has a rim surrounding said screening and contacting the downstream surface of said installed backup plate.

* * * * *